US012664729B2

(12) United States Patent
Liu et al.

(10) Patent No.: US 12,664,729 B2
(45) Date of Patent: Jun. 23, 2026

(54) IMAGE PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Wentao Liu, Beijing (CN); Hang Zhao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 182 days.

(21) Appl. No.: 18/686,235

(22) PCT Filed: Sep. 21, 2022

(86) PCT No.: PCT/CN2022/120167
§ 371 (c)(1),
(2) Date: Feb. 23, 2024

(87) PCT Pub. No.: WO2023/051342
PCT Pub. Date: Apr. 6, 2023

(65) Prior Publication Data
US 2024/0378812 A1     Nov. 14, 2024

(30) Foreign Application Priority Data

Sep. 30, 2021     (CN) .......................... 202111162208.X

(51) Int. Cl.
*G06T 17/20*          (2006.01)
*G06T 5/73*           (2024.01)
(Continued)

(52) U.S. Cl.
CPC ................ *G06T 17/20* (2013.01); *G06T 5/73* (2024.01); *G06T 7/11* (2017.01); *G06T 7/13* (2017.01);
(Continued)

(58) Field of Classification Search
CPC ... G06T 7/11; G06T 7/13; G06T 17/20; G06T 7/50; G06T 7/194; G06T 7/162;
(Continued)

(56) References Cited

U.S. PATENT DOCUMENTS

| 8,970,583 B1 | 3/2015 | Overbeck et al. | |
| 10,789,723 B1 * | 9/2020 | Kopf ....................... | G06T 17/20 |

(Continued)

FOREIGN PATENT DOCUMENTS

| CN | 106296779 A | * | 1/2017 |
| CN | 106228507 B | | 6/2019 |

(Continued)

OTHER PUBLICATIONS

Farin, D., Peerlings, R. and de With, P.H., 2007, May. Depth-image representation employing meshes for intermediate-view rendering and coding. In 2007 3DTV Conference (pp. 1-4). IEEE.*

(Continued)

*Primary Examiner* — Phu K Nguyen
(74) *Attorney, Agent, or Firm* — BakerHostetler

(57) ABSTRACT

An image processing method, apparatus, electronic device and storage medium are provided. The method includes: acquiring a depth image corresponding to a target image; determining a first undirected graph according to the target image and the depth image, the first undirected graph including a first node corresponding to a background edge and a second node corresponding to a foreground edge, and there being no edge connection between the first node and the second node; and deriving one or more third nodes by taking the first node as a reference to obtain a second undirected graph.

20 Claims, 7 Drawing Sheets

(51) Int. Cl.

| | |
|---|---|
| *G06T 7/11* | (2017.01) |
| *G06T 7/13* | (2017.01) |
| *G06T 7/194* | (2017.01) |
| *G06T 7/50* | (2017.01) |
| *G06T 15/04* | (2011.01) |

(52) U.S. Cl.
CPC ............... *G06T 7/194* (2017.01); *G06T 7/50* (2017.01); *G06T 15/04* (2013.01); *G06T 2207/20021* (2013.01)

(58) Field of Classification Search
CPC . G06T 15/04; G06T 5/73; G06T 2207/10028; G06T 2207/20021
USPC ........................................................ 345/418
See application file for complete search history.

(56) References Cited

U.S. PATENT DOCUMENTS

| | | | | |
|---|---|---|---|---|
| 2019/0251702 A1* | 8/2019 | Chandler | ................ | G06F 3/017 |
| 2021/0124475 A1* | 4/2021 | Inch | ........................ | G06F 3/011 |
| 2023/0162445 A1* | 5/2023 | Mason | .................. | G06T 17/205 345/419 |
| 2024/0119670 A1* | 4/2024 | Wu | ....................... | G06T 17/005 |
| 2024/0310851 A1* | 9/2024 | Ebrahimi Afrouzi | ... | G01S 17/87 |
| 2024/0361891 A1* | 10/2024 | Bagnall | ............... | G06F 3/04845 |
| 2025/0080710 A1* | 3/2025 | Nims | .................. | H04N 13/271 |

FOREIGN PATENT DOCUMENTS

| | | | | | |
|---|---|---|---|---|---|
| CN | 110415351 A | * | 11/2019 | ............ | G06T 17/20 |
| CN | 110874864 A | | 3/2020 | | |
| CN | 112967381 A | | 6/2021 | | |
| CN | 113870436 A | | 12/2021 | | |

OTHER PUBLICATIONS

Liu, Z., Wu, K., Guo, J., Wang, Y., Deussen, O. and Cheng, Z., 2021. Single image tree reconstruction via adversarial network. Graphical Models, 117, p. 101115.*

International Patent Application No. PCT/CN2022/120167; Int'l Search Report and Written Opinion; dated Nov. 29, 2022; 7 pages.

* cited by examiner

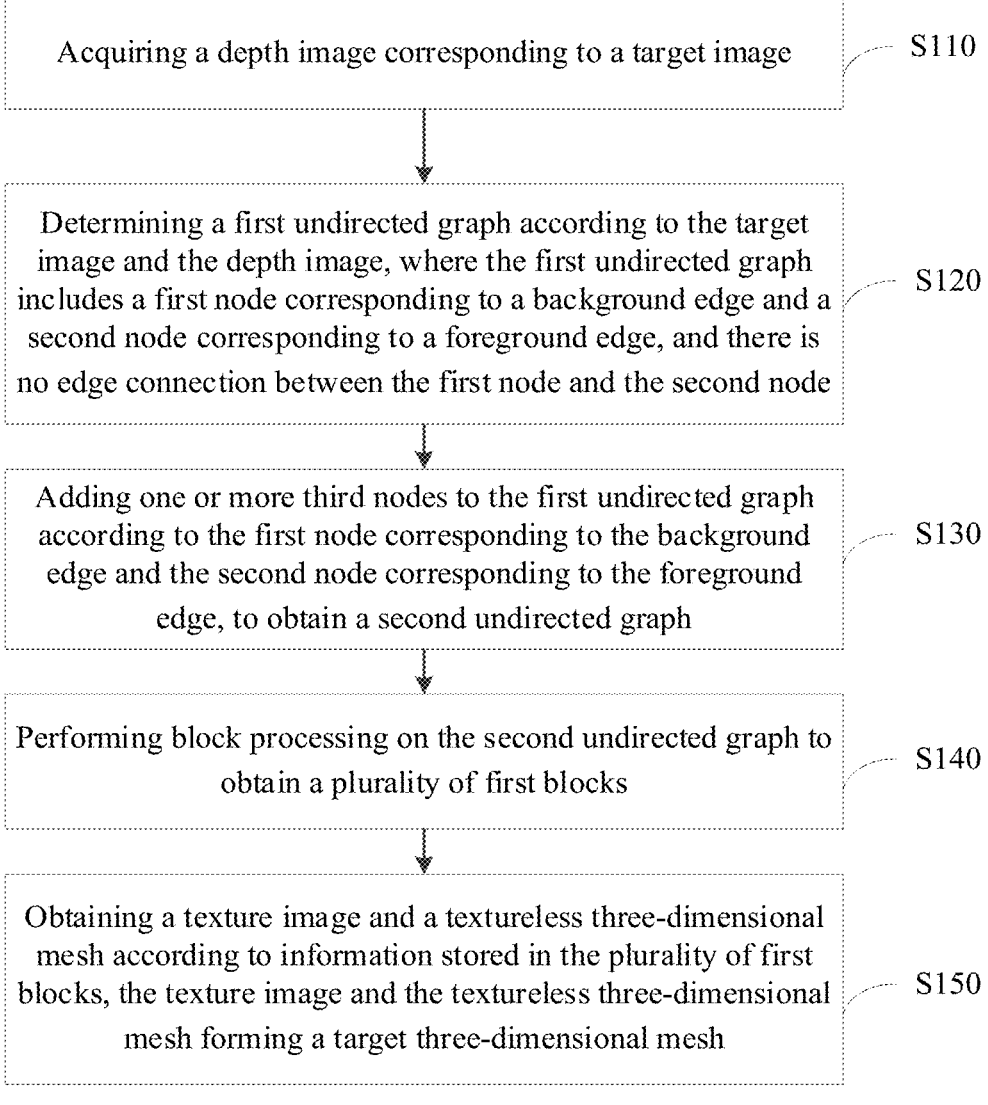

Acquiring a depth image corresponding to a target image  — S110

Determining a first undirected graph according to the target image and the depth image, where the first undirected graph includes a first node corresponding to a background edge and a second node corresponding to a foreground edge, and there is no edge connection between the first node and the second node  — S120

Adding one or more third nodes to the first undirected graph according to the first node corresponding to the background edge and the second node corresponding to the foreground edge, to obtain a second undirected graph  — S130

Performing block processing on the second undirected graph to obtain a plurality of first blocks  — S140

Obtaining a texture image and a textureless three-dimensional mesh according to information stored in the plurality of first blocks, the texture image and the textureless three-dimensional mesh forming a target three-dimensional mesh  — S150

FIG. 1

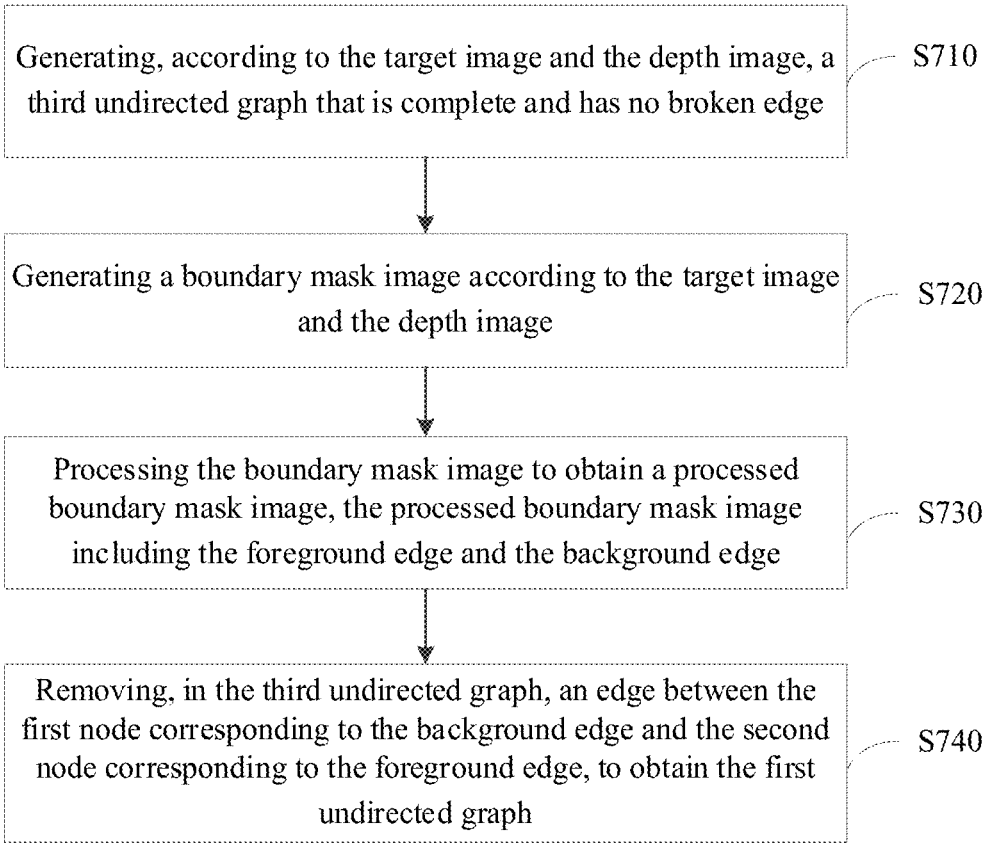

Generating, according to the target image and the depth image, a third undirected graph that is complete and has no broken edge ⟋⎯ S710

Generating a boundary mask image according to the target image and the depth image ⟋⎯ S720

Processing the boundary mask image to obtain a processed boundary mask image, the processed boundary mask image including the foreground edge and the background edge ⟋⎯ S730

Removing, in the third undirected graph, an edge between the first node corresponding to the background edge and the second node corresponding to the foreground edge, to obtain the first undirected graph ⟋⎯ S740

FIG. 7

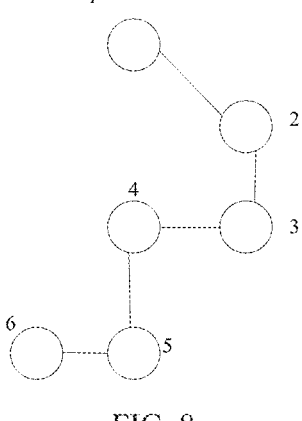

FIG. 8

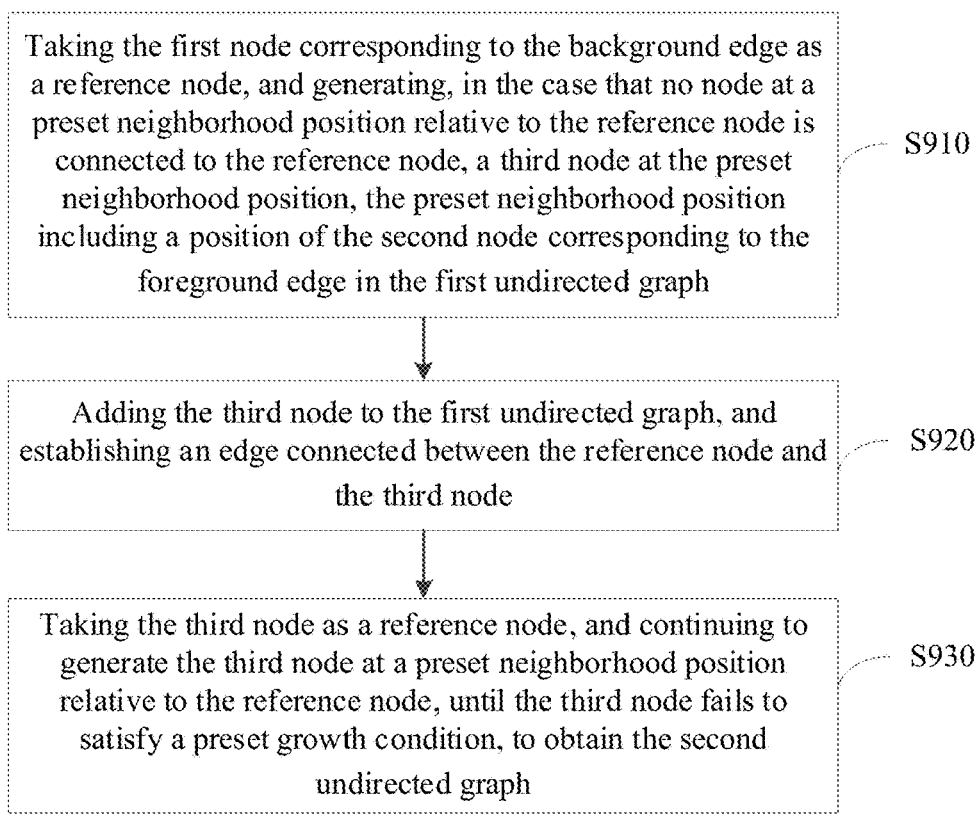

Taking the first node corresponding to the background edge as a reference node, and generating, in the case that no node at a preset neighborhood position relative to the reference node is connected to the reference node, a third node at the preset neighborhood position, the preset neighborhood position including a position of the second node corresponding to the foreground edge in the first undirected graph — S910

Adding the third node to the first undirected graph, and establishing an edge connected between the reference node and the third node — S920

Taking the third node as a reference node, and continuing to generate the third node at a preset neighborhood position relative to the reference node, until the third node fails to satisfy a preset growth condition, to obtain the second undirected graph — S930

FIG. 9

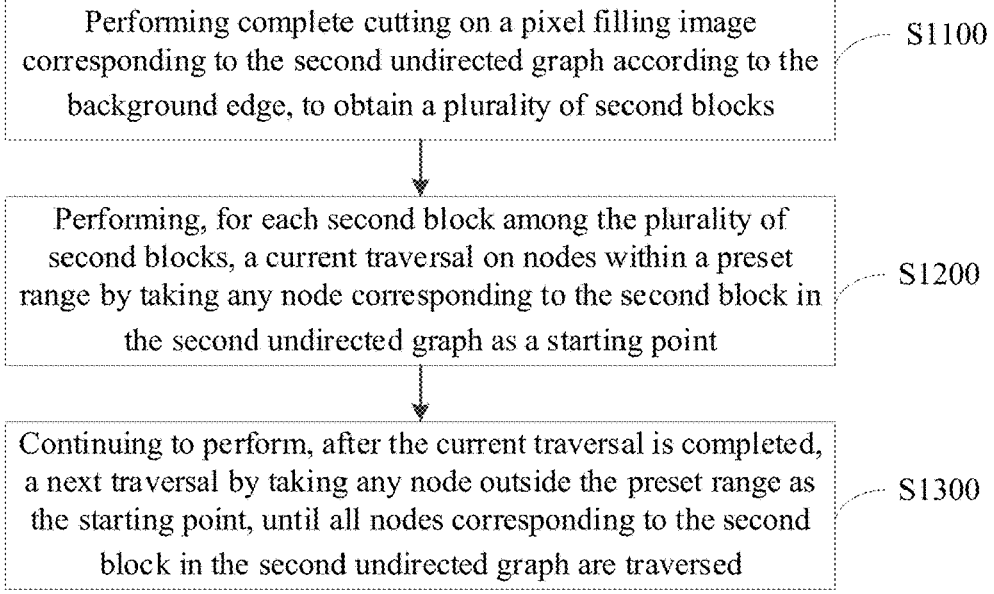

Performing complete cutting on a pixel filling image corresponding to the second undirected graph according to the background edge, to obtain a plurality of second blocks — S1100

Performing, for each second block among the plurality of second blocks, a current traversal on nodes within a preset range by taking any node corresponding to the second block in the second undirected graph as a starting point — S1200

Continuing to perform, after the current traversal is completed, a next traversal by taking any node outside the preset range as the starting point, until all nodes corresponding to the second block in the second undirected graph are traversed — S1300

FIG. 10

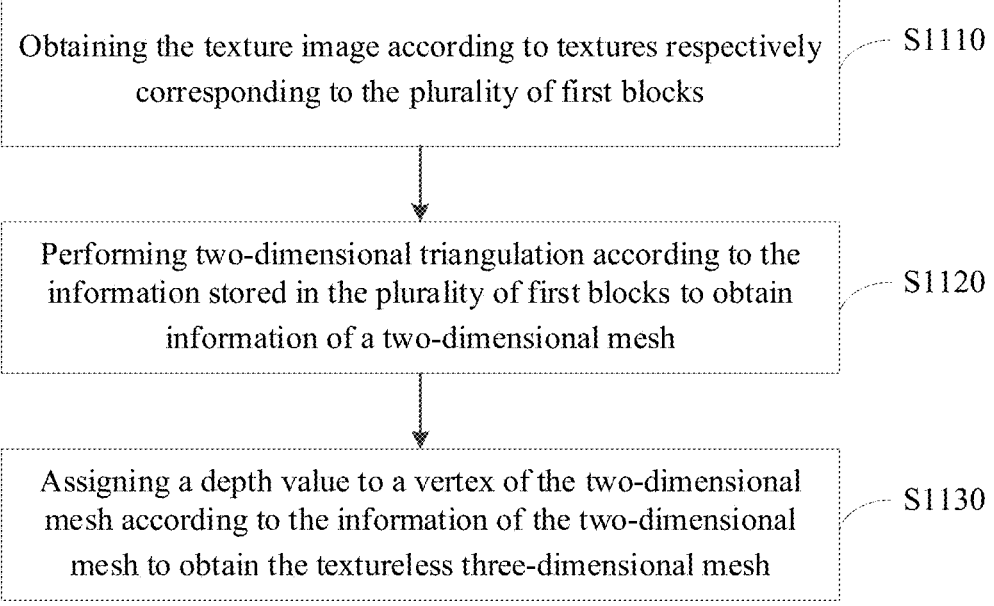

Obtaining the texture image according to textures respectively corresponding to the plurality of first blocks — S1110

Performing two-dimensional triangulation according to the information stored in the plurality of first blocks to obtain information of a two-dimensional mesh — S1120

Assigning a depth value to a vertex of the two-dimensional mesh according to the information of the two-dimensional mesh to obtain the textureless three-dimensional mesh — S1130

FIG. 11

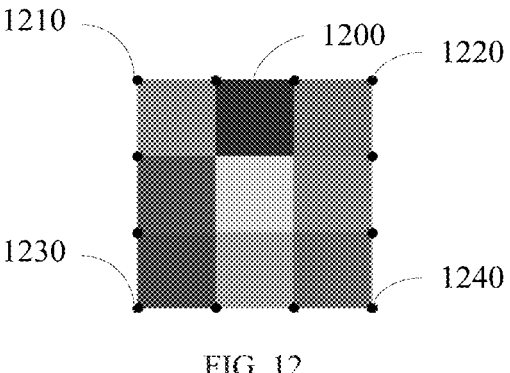

IMAGE PROCESSING METHOD AND APPARATUS, AND ELECTRONIC DEVICE AND STORAGE MEDIUM

CROSS-REFERENCE TO RELATED APPLICATION

The present application is the U.S. National Stage of International Application No. PCT/CN2022/120167, filed on Sep. 21, 2022, which claims the priority of the Chinese patent application No. 202111162208.X, entitled "IMAGE PROCESSING METHOD, APPARATUS, ELECTRONIC DEVICE AND STORAGE MEDIUM", filed on Sep. 30, 2021, which are herein incorporated by reference in their entireties.

TECHNICAL FIELD

The present disclosure relates to the field of information technology, and in particular to an image processing method, apparatus, electronic device and storage medium.

BACKGROUND

In the prior art, after a series of processing is performed on an image, a three-dimensional (3-dimension, 3D) mesh corresponding to the image can be generated. Further, by performing three-dimensional rendering according to the three-dimensional mesh, a dynamic effect image corresponding to the image can be generated.

However, in the dynamic effect image, the edge of the foreground part will be distorted or the image hole will appear in the foreground part.

SUMMARY

In order to solve the above technical problem or at least partially solve the above technical problem, embodiments of the present disclosure provide an image processing method, apparatus, electronic device and storage medium, which can effectively solve the phenomenon of image hole and edge distortion of the foreground part and reduce time consumption.

Embodiments of the present disclosure provides an image processing method, which includes:

acquiring a depth image corresponding to a target image;
  determining a first undirected graph according to the target image and the depth image, where the first undirected graph includes a first node corresponding to a background edge and a second node corresponding to a foreground edge, and there is no edge connection between the first node and the second node;
  adding one or more third nodes to the first undirected graph according to the first node corresponding to the background edge and the second node corresponding to the foreground edge, to obtain a second undirected graph;
  performing block processing on the second undirected graph to obtain a plurality of first blocks; and
  obtaining a texture image and a textureless three-dimensional mesh according to information stored in the plurality of first blocks, the texture image and the textureless three-dimensional mesh forming a target three-dimensional mesh.

Embodiments of the present disclosure further provides an image processing apparatus, which includes:

an acquiring module, configured to acquire a depth image corresponding to a target image;
  a determining module, configured to determine a first undirected graph according to the target image and the depth image, where the first undirected graph includes a first node corresponding to a background edge and a second node corresponding to a foreground edge, and there is no edge connection between the first node and the second node;
  an adding module, configured to add one or more third nodes to the first undirected graph according to the first node corresponding to the background edge and the second node corresponding to the foreground edge, to obtain a second undirected graph; and
  a processing module, configured to perform block processing on the second undirected graph to obtain a plurality of first blocks, and obtain a texture image and a textureless three-dimensional mesh according to information stored in the plurality of first blocks, the texture image and the textureless three-dimensional mesh forming a target three-dimensional mesh.

Embodiments of the present disclosure further provides an electronic device, which includes:

one or more processors; and
  a storage apparatus, configured to store one or more programs;
  the one or more programs, when executed by the one or more processors, causing the one or more processors to implement the above image processing method.

Embodiments of the present disclosure further provides a computer-readable storage medium which stores computer programs, the computer programs when executed by a processor implements the above image processing method.

Embodiments of the present disclosure further provide a computer program product, which includes computer programs or instructions which, when executed by a processor, implement the above image processing method.

Compared with the prior art, the technical solutions provided by the embodiments of the present disclosure have at least the following advantages: in the image processing method provided by the embodiment of the present disclosure, a depth image corresponding to a target image is acquired; a first undirected graph is determined according to the target image and the depth image, the first undirected graph includes a first node corresponding to a background edge and a second node corresponding to a foreground edge, and there is no edge connection between the first node and the second node; in the case that there is no adjacent node of the first node in one or several adjacent directions of the first node, one or more third nodes are added to the first undirected graph according to the first node and the second node corresponding to the foreground edge, the one or more third nodes being added are specifically nodes derived from the first node, and the derived nodes are directly or indirectly connected to the first node. After adding the one or more third nodes to the first undirected graph, a second undirected graph is obtained, so that nodes having overlapping positions appear at some positions in the second undirected graph, that is, a part of the third nodes derived from the first node overlap with the positions of the second nodes, and another part of the third nodes overlap with the positions of nodes in the foreground part and close to the foreground edge. Further, block processing is performed on the second undirected graph to obtain a plurality of first blocks, a texture image and a textureless three-dimensional mesh are obtained according to information stored in the plurality of first blocks, and the texture image and the textureless three-dimensional mesh form a target three-dimensional mesh. There are nodes with overlapping positions in the second undirected graph, and in particular, there are third nodes having overlapping positions with the second nodes and third nodes having overlapping positions with the nodes in the foreground part and close to the foreground edge. Therefore, overlapping pixels can appear in the vicinity of the foreground edge and the background edge within the target three-dimensional mesh, and the overlapping pixels can be understood as upper and lower layers of pixels. When performing three-dimensional rendering according to the target three-dimensional mesh, a dynamic effect can be rendered according to the upper pixel in the upper and lower layers of pixels. Because there is a fixed pixel below the upper pixel, even if the dynamic effect is presented in a large range of moving viewing angles, it can effectively avoid the phenomena of edge distortion or image hole, etc., of the foreground part during the process of presenting the dynamic effect.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

FIG. 1 is a flowchart of an image processing method according to an embodiment of the present disclosure;

FIG. 7 is a flowchart of another image processing method according to an embodiment of the present disclosure;

FIG. 8 is a schematic structural diagram of pixel points according to an embodiment of the present disclosure;

FIG. 9 is a flowchart of another image processing method according to an embodiment of the present disclosure;

FIG. 10 is a flowchart of another image processing method according to an embodiment of the present disclosure;

FIG. 11 is a flowchart of another image processing method according to an embodiment of the present disclosure;

FIG. 12 is a schematic structural diagram of an image block provided by an embodiment of the present disclosure;

DETAILED DESCRIPTION

Figure 2:
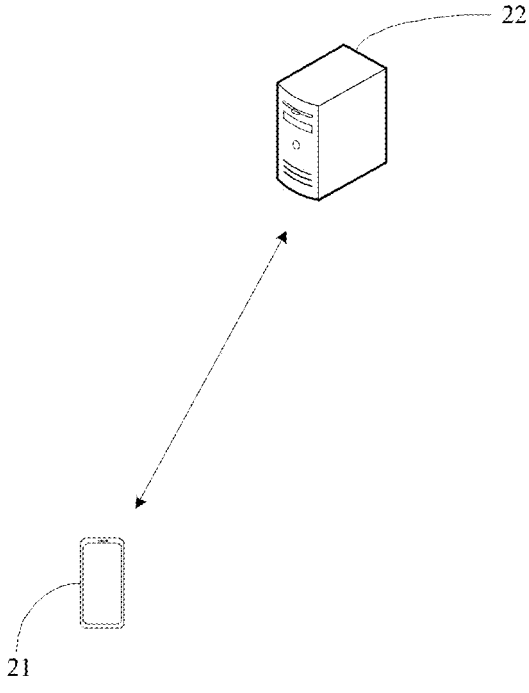
FIG. 2 is a schematic diagram of an application scenario according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of the messages or information interacted with between the plurality of apparatuses of the embodiments of the present disclosure are used for illustrative purposes only and are not intended to place limitations on the scope of those messages or information.

In the prior art, there are mainly the following methods of generating a three-dimensional mesh from an image. (1) An image is uploaded to the server for processing and then is distributed after being processed. This method makes the user need to upload the content to the server for processing and cannot be used offline; (2) The foreground and the background are not segmented, that is, the foreground part and the background part in the picture are not separated from each other, and the image is directly converted into a three-dimensional mesh. This method needs to limit the user's observation in a small visual range to avoid the visual distortion at the edge of the object (the edge of the foreground part); (3) The foreground part and the background part are segmented, and a three-dimensional mesh is generated after the occluded region in the background part is filled. This method requires complicated image processing, has a high error rate and is not easy to implement. The present disclosure makes improvements based on the method (3), so that the fault tolerance is increased, the performance consumption is reduced, and the time consumption is relatively short.

In view of the above technical problems, an embodiment of the present disclosure provides an image processing method. A target image and a depth image corresponding thereto are acquired. Then, a depth edge is acquired according to the target image and the depth image based on an edge detection algorithm, the depth edge refers to a foreground edge and a background edge. Next, a layer depth image is constructed based on the depth edge, and hole filling is performed on the layer depth image to obtain an undirected graph. And then, block processing is performed on the undirected graph to obtain a plurality of first blocks without overlapping regions, and each first block corresponds to an image block. According to the texture image and the textureless three-dimensional mesh of each image block, that is, by performing triangulation on the two-dimensional image to obtain the textureless three-dimensional mesh, and then stitching the simple texture images, the final target three-dimensional mesh result is obtained. Generation of the three-dimensional mesh of an image of any type and size can be completed with fewer restrictions, so that the user can observe the three-dimensional effect of the scene shown by the image in a large range of moving viewing angles, and the method can also be applied to offline terminals with relatively low time consumption.

FIG. 1 is a flowchart of an image processing method according to an embodiment of the present disclosure. The present embodiment can be applicable to the case of image processing in a client. The method can be executed by an image processing apparatus, the apparatus can be implemented in the form of software and/or hardware, and the apparatus can be configured in an electronic device, such as a terminal, including but not limited to a smart phones, a handheld computer, a tablet computers, a wearable device with a display screen, a desktop computer, a laptop computers, an all-in-one computer, a smart home device, etc. Alternatively, the present embodiment can be applicable to the case of image processing in a server. The method can be executed by an image processing apparatus, the apparatus can be implemented in the form of software and/or hardware, and the apparatus can be configured in an electronic device, such as a server.

Understandably, in some possible implementations, the above image processing method can also be executed by a terminal and a server in cooperation. Referring to FIG. 2, FIG. 2 is a schematic diagram of an application scenario provided by an embodiment of the present disclosure. The image processing method includes the following feasible implementations. One feasible implementation is: the terminal 21 acquires a target image and obtains a depth image according to the target image, and then transmits the target image and the depth image to the server 22, and the server 22 performs image processing to obtain a three-dimensional mesh corresponding to the target image. Another feasible implementation is: the terminal 21 acquires a target image and performs image processing according to the target image to obtain a three-dimensional mesh corresponding to the target image. The target image can be captured by the terminal 21. Alternatively, the target image is acquired by the terminal 21 from another device. Alternatively, the target image is an image obtained after the terminal 21 performs image processing on a preset image, and the preset image can be captured by the terminal 21, or the preset image can be obtained by the terminal 21 from another device. Here, the another device is not specifically limited. It can be understood that the image processing method provided by the present disclosure is not limited to be applied to the above possible scenarios.

Hereinafter, that the terminal 21 acquires a target image and performs image processing according to the target image to obtain a three-dimensional mesh corresponding to the target image is taken as an example for illustration.

As shown in FIG. 1, the method can specifically include steps S110 to S150 as follows:

S110: acquiring a depth image corresponding to a target image.

Understandably, after the terminal obtains the target image, the depth image corresponding to the target image can be obtained through related technologies. For example, a monocular depth estimation algorithm can be adopted to acquire the depth image corresponding to the target image. The target image can be a color system image (RGB three-color image), and the depth image can be an image obtained by performing monocular depth estimation on the RGB image.

S120: determining a first undirected graph according to the target image and the depth image, where the first undirected graph includes a first node corresponding to a background edge and a second node corresponding to a foreground edge, and there is no edge connection between the first node and the second node.

Understandably, on the basis of S110, a Layer Depth Image (LDI) is constructed according to the target image and the depth image to obtain a first undirected graph, and the data structure of the layer depth image is an undirected graph. The undirected graph is a data structure in computer concept, which can store data. In the undirected graph, data is stored in the form of nodes, and each node stores three groups of data including position information, color information and depth value. The position information refers to the image position of the corresponding pixel under the resolution of the depth image or the RGB image. The first undirected graph includes a background edge and a foreground edge. The nodes stored in the background edge are referred to as first nodes, and the nodes stored in the foreground edge are referred to as second nodes. There is no edge connection between the first node and the second node. The edge is an indicator of whether the nodes included in the first undirected graph are connected. If there is an edge between any first node and any second node, it means that there is a connection relationship between the any first node and the any second node. If there is no edge between any first node and any second node, it means that there is no connection relationship between the any first node and the any second node.

Understandably, the relationship between pixels in the target image and nodes in the depth image can be understood as follows: the target image includes a plurality of pixels, and for example, the target image includes 100 pixels; each pixel among the 100 pixels can correspond to one node, or some pixels among the 100 pixels have corresponding nodes, and the remaining pixels do not have corresponding nodes, that is, the number of nodes may be less than or equal to the number of pixels. For another example, 9 pixels out of the 100 pixels have corresponding nodes, and the remaining 91 pixels may not have corresponding nodes; and the 9 pixels can be pixel points that are able to represent the main features of the image. Only the pixels of the main features of the image are set to have corresponding nodes, so that the image features are retained to the maximum extent, and at the same time, the subsequent node-based computing can be accelerated, computing power can be saved and computing time can be reduced. In the undirected graph, there will be 9 nodes, and one node corresponds to one pixel. In the present disclosure, each pixel among the 100 pixels included in the target image can correspond to one node, and the constructed first undirected graph can include 100 nodes. It can be understood that the nodes corresponding to adjacent pixels in the target image are also adjacent to each other in the first undirected graph.

Figure 3:
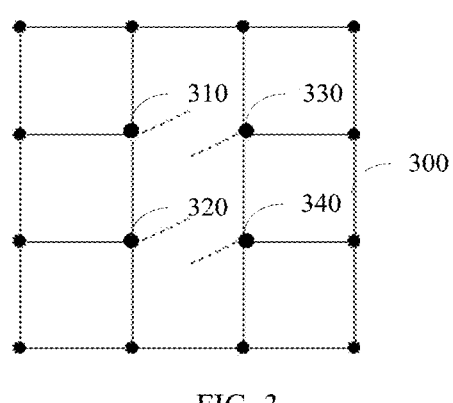
FIG. 3 is a schematic structural diagram of an undirected graph according to an embodiment of the present disclosure.

Illustratively, referring to FIG. 3, which is a schematic structural diagram of an undirected graph provided by an embodiment of the present disclosure, a partial undirected graph 300 includes first nodes 310 and 320 corresponding to the background edge and second nodes 330 and 340 corresponding to the foreground edge. There is no edge connection between the first node 310 and the second node 330, or the connected edges are broken as shown by the dashed line in the figure. Breaking the connected edge between nodes means deleting the connected edge between the nodes, so that it is convenient to distinguish the foreground edge from the background edge. There is no edge connection between the first node 320 and the second node 340, there is an edge connection between the first nodes 310 and 320, and there is an edge connection between the second nodes 330 and 340.

Figure 4:
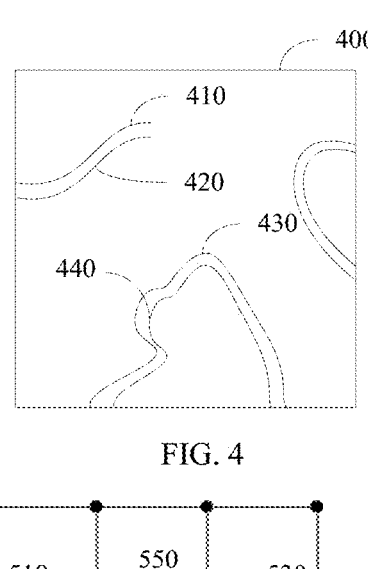
FIG. 4 is a schematic structural diagram of a boundary mask image according to an embodiment of the present disclosure.

Illustratively, referring to FIG. 4, which is a schematic structural diagram of a boundary mask image provided by an embodiment of the present disclosure, in the boundary mask image 400, 410 is a background edge, and the background edge 410 is formed of a plurality of pixels; 420 is a foreground edge, 430 is a background edge, and 440 is a foreground edge. The background edge can be understood as an edge that extends by one or more pixels outward on the basis of the foreground edge, the background edge includes a plurality of pixels with relatively large depth values, the foreground edge includes a plurality of pixels with relatively small depth values, and the depth values of pixels on the background edge are greater than the depth values of pixels on the foreground edge.

S130: adding one or more third nodes to the first undirected graph according to the first node corresponding to the background edge and the second node corresponding to the foreground edge, to obtain a second undirected graph.

Understandably, on the basis of S120, according to the first node corresponding to the background edge and the second node corresponding to the foreground edge in the first undirected graph, one or more third nodes are added to the first undirected graph, to obtain a second undirected graph. The third nodes can be understood as being generated according to the first nodes, that is, new nodes are added to the undirected graph. The third node and the second node include the same position information, the third node and the first node include the same depth value, the color information of the third node is generated according to the color information of the first node, and the third node and the first node are connected by an edge. The third node and the second node including the same position information can ensure that there are a plurality of pixels at the same position, that is, nodes are redundantly backed up at the same position, and both the third node and the second node exist at the same position. One node will correspond to one or more pixel points, so there will be overlapping pixel points at the edge of the image, which can reduce the probability of distortion at the foreground edge. When all pixel points on the foreground edge of the image move in a large range of user vision, third nodes are generated from the background edge to fill the moving foreground edge, which can reduce the phenomenon of image hole.

Figure 5:
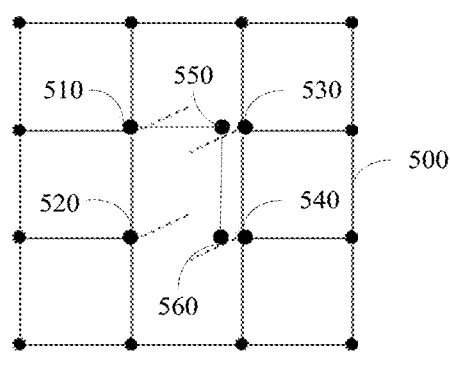
FIG. 5 is a schematic structural diagram of another undirected graph according to an embodiment of the present disclosure.

Illustratively, referring to FIG. 5, it is a schematic structural diagram of another undirected graph provided by an embodiment of the present disclosure. A third node 550 is generated according to the first node 510 and the second node 530, the third node 550 stores the same position information as the second node 530, the third node 550 stores the same depth value as the first node 510, and there is an edge connection between the first node 510 and the third node 550. The third node 550, together with the second node 540, can also generate a third node 560, the third node 560 and the second node 540 have the same position information, and so on in an analogous manner to keep spreading and adding new third nodes. It can be understood that the rule of adding the third nodes can be based on the rule of 4-connectivity or 8-connectivity. Taking 4-connectivity as an example, the node adjacent and connected to the right side of the first node 510 is missing, so a third node 550 is generated on the right side of the first node 510, and the growth (addition) process of the adjacent and connected nodes missing from other first nodes is similar to the growth (addition) process of the third node 550, which will not be repeated here.

S140: performing block processing on the second undirected graph to obtain a plurality of first blocks.

Understandably, on the basis of S130, block processing is performed on the second undirected graph with new nodes to obtain a plurality of first blocks, and a flood filling algorithm can be used to perform block processing on the filled second undirected graph. Because each node in the undirected graph corresponds to one pixel point in the target image, one first block can correspond to one image block; the first block can include one or more nodes, and the image block corresponding to the first block can also include one or more nodes. And then performing block processing on the filled undirected graph can ensure the two-dimensional property and neighboring (connection) property of the image block, thus facilitating subsequent three-dimensional meshing process. Ensuring the two-dimensional property of an image block requires that no node with the same position information may appear in the first block corresponding to the image block, that is, the image block corresponding to the first block cannot have overlapping points in the image space.

S150: obtaining a texture image and a textureless three-dimensional mesh according to information stored in the plurality of first blocks, the texture image and the textureless three-dimensional mesh forming a target three-dimensional mesh.

Understandably, on the basis of S140, according to the information stored in the plurality of first blocks, a texture image and a textureless three-dimensional mesh are obtained, and then a target three-dimensional mesh is formed from the textured image and the textureless three-dimensional mesh, thus completing the division of the three-dimensional mesh of the target image. The first block may include a plurality of nodes, and the information stored in the first block is namely the information stored by the plurality of nodes. The information stored by a node mainly refers to color information, position information and depth value, etc. Generally, a three-dimensional mesh contains a plurality of three-dimensional vertices (vertices of a textureless three-dimensional mesh) and texture images corresponding thereto. In some cases, a three-dimensional mesh may include 3000 three-dimensional vertices.

Figure 6:
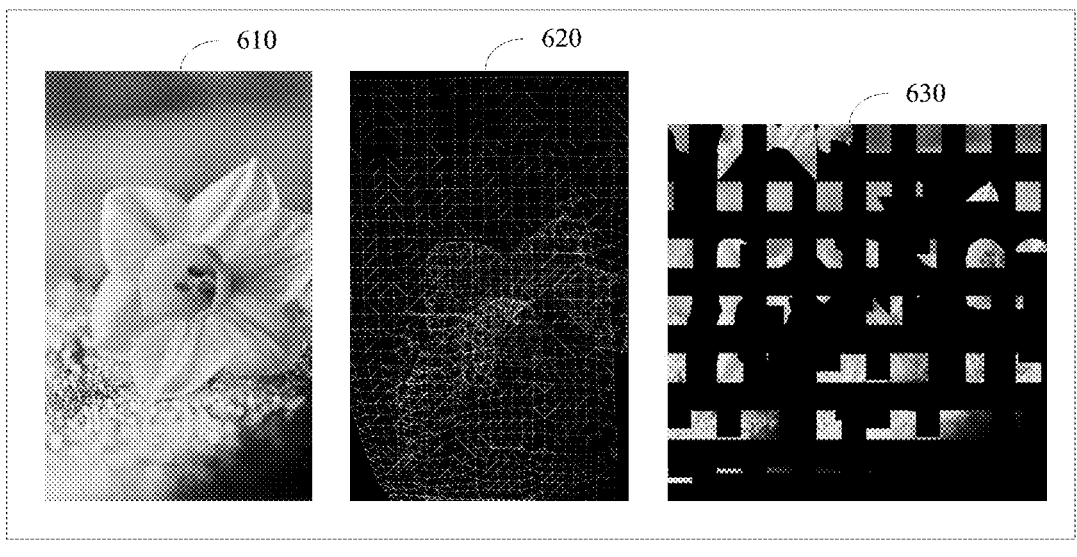
FIG. 6 is a schematic diagram of a three-dimensional mesh according to an embodiment of the present disclosure.

For example, referring to FIG. 6, which is a schematic structural diagram of a three-dimensional mesh provided by an embodiment of the present disclosure, the three-dimensional mesh refers to the target three-dimensional mesh in S150. 610 is a target image, 620 is a textureless three-dimensional mesh, 630 is part of texture images, and the target three-dimensional mesh is formed of the three-dimensional mesh 620 without texture and the texture image 630.

In the image processing method provided by the embodiment of the present disclosure, a depth image corresponding to a target image is acquired; a first undirected graph is determined according to the target image and the depth image, the first undirected graph includes a first node corresponding to a background edge and a second node corresponding to a foreground edge, and there is no edge connection between the first node and the second node; if there is no adjacent node of the first node in one or more adjacent directions of the first node, one or more third nodes are added to the first undirected graph according to the first node and the second node corresponding to the foreground edge, the one or more third nodes being added are specifically nodes derived from the first node, and the derived nodes are directly or indirectly connected to the first node. After adding the one or more third nodes to the first undirected graph, a second undirected graph is obtained, so that nodes having overlapping positions appear at some positions in the second undirected graph, that is, a part of the third nodes derived from the first node overlap with the positions of the second nodes, and another part of the third nodes overlap with the positions of nodes in the foreground part and close to the foreground edge. Further, block processing is performed on the second undirected graph to obtain a plurality of first blocks, a texture image and a textureless three-dimensional mesh are obtained according to information stored in the plurality of first blocks, and the texture image and the textureless three-dimensional mesh form a target three-dimensional mesh. There are nodes with overlapping positions in the second undirected graph, and in particular, there are third nodes having overlapping positions with the second nodes and third nodes having overlapping positions with the nodes in the foreground part and close to the foreground edge. Therefore, overlapping pixels can appear in the vicinity of the foreground edge and the background edge within the target three-dimensional mesh, and the overlapping pixels can be understood as upper and lower layers of pixels. When performing three-dimensional rendering according to the target three-dimensional mesh, a dynamic effect can be rendered according to the upper pixel in the upper and lower layers of pixels. Because there is a fixed pixel below the upper pixel, even if the dynamic effect is presented in a large range of moving viewing angles, it can effectively avoid the phenomena of edge distortion or image hole, etc., of the foreground part during the process of presenting the dynamic effect.

In addition, in the embodiment of the present disclosure, block processing is performed on the second undirected graph to obtain a plurality of first blocks, so that a textureless three-dimensional mesh can be obtained by triangulation based on the two-dimensional image. Further, according to the texture image and the textureless three-dimensional mesh, the target three-dimensional mesh, that is, the final three-dimensional mesh, is formed. Compared with directly using three-dimensional triangulation to obtain the final three-dimensional mesh, this process greatly reduces the time consumption, so that generation algorithm of the target three-dimensional mesh can be transplanted to the mobile terminal to run offline.

On the basis of the above embodiment, FIG. 7 is a flowchart of another image processing method according to an embodiment of the present disclosure. Optionally, determining the first undirected graph according to the target image and the depth image, specifically includes the following steps S710 to S740 as shown in FIG. 7:

S710: generating, according to the target image and the depth image, a third undirected graph that is complete and has no broken edge.

Understandably, a third undirected graph that is complete and has no broken edge is generated according to the target image and the depth image. In the third undirected graph that is complete and has no broken edge, there are edges between each node and four adjacent nodes, that is, in the third undirected graph, there are edges between nodes as long as the nodes are neighboring.

S720: generating a boundary mask image according to the target image and the depth image.

Optionally, generating the boundary mask image specifically includes: sharpening the depth image to obtain a sharpened depth image; and generating the boundary mask image according to the target image and the sharpened depth image.

Understandably, a weighted median filtering algorithm is used to sharpen the depth image to obtain the sharpened depth image, and then, according to the target image and the sharpened depth image, an edge detection algorithm (Canny operator) is used for processing, to obtain the boundary mask image.

S730: processing the boundary mask image to obtain a processed boundary mask image, the processed boundary mask image including the foreground edge and the background edge.

Understandably, the boundary mask image is processed, which includes removing redundant pixels, removing short edges, filling holes, etc. Each boundary in the boundary mask image is subjected to a smoothing process, a connecting process and a process of disconnecting an edge between nodes at the boundary, to obtain the processed boundary mask image.

Illustratively, the processed boundary mask image can be referred to FIG. 4 for details. The processed boundary mask image 400 includes a foreground edge and a background edge, and the foreground edge and the background edge can be distinguished by different colors. The processed boundary mask image 400 includes three boundaries, such as boundary 1 formed of a background edge 410 and a foreground edge 420, boundary 2 formed of a background edge 430 and a foreground edge 440, and so on.

Optionally, obtaining the processed boundary mask image specifically includes: processing one or more boundaries in the boundary mask image to obtain a foreground edge in the boundary mask image; and generating a background edge in the boundary mask image according to the foreground edge in the boundary mask image, to obtain the processed boundary mask image.

Understandably, the boundary mask image before processing corresponding to FIG. 4 may include more than 3 boundaries, and each boundary includes a plurality pixel points. For each boundary, the redundant pixel points on the boundary are removed to obtain the foreground edge in the boundary mask image, and the background edge in the boundary mask image is generated according to the relationship between the depth values of the foreground edge and the background edge, thus obtaining the processed boundary mask image. The processed boundary mask image includes the foreground edge and the background edge.

Optionally, processing the one or more boundaries in the boundary mask image to obtain the foreground edge in the boundary mask image specifically includes: removing, for each boundary in the boundary mask image, redundant pixel points on the boundary; connecting boundaries with a distance less than a preset distance in the boundary mask image; and removing boundaries having a length less than a preset length in the boundary mask image, and taking remaining boundaries in the boundary mask image as the foreground edge in the boundary mask image.

Understandably, for each boundary (foreground edge) in the boundary mask image, all pixels on the boundary are traversed, and the redundant pixels on the boundary are removed. A redundant pixel means that the connectivity of the boundary is not destroyed after this pixel is deleted. The processing rule can be 8 neighborhood connectivity (8-connectivity). If 8-connectivity is not destroyed, the currently traversed pixel is deleted to remove the redundant pixels and construct an 8-connectivity boundary with single pixel thickness. After deleting the redundant pixels, the boundaries with a distance less than a preset distance in the boundary mask image are connected, which can also be understood as that the segments included in a boundary are connected. Specifically, the boundary or segment in the boundary mask image can be calculated according to the edge detection algorithm and the 8-connectivity calculation rule, and the pixels on each segment are traversed to find the endpoints of the each segment. For each pixel on any segment, it is judged whether the removal of this pixel will lead to an increase in the number of connected domains in the boundary mask image; if not, then this pixel is an endpoint. One boundary or one segment can be regarded as a connected domain, and each segment has two endpoints; two endpoints, between which the distance is less than the preset distance, on the segments are connected, so that a plurality of segments are merged into a complete boundary. After the plurality of segments are connected, the boundaries having a length less than a preset length in the boundary mask image are removed. That is, there is a case in which the distance between two boundaries is greater than the preset distance, this case may be that the two boundaries do not belong to the same part of the same object, that is, the two boundaries are not connected in the image space. In this case, it is necessary to remove the short edge, which refers to the boundary having a length less than the preset length. In the process of removing the short edge, the algorithm can directly default that the boundary shorter than the preset length does not exist, and then the remaining boundaries in the boundary mask image are taken as foreground edges in the boundary mask image.

For example, referring to FIG. 8, it is a schematic structural diagram of pixel points provided by an embodiment of the present disclosure. In FIG. 8, any boundary in the boundary mask image is shown, and this boundary includes 6 pixel points. According to the connection rule of 4-connectivity or 8-connectivity, assuming that the traversal starts from pixel 1, pixel 1, as an endpoint, cannot be deleted. After traversing to pixel 2, assuming that pixel 2 is removed, pixel 1 and pixel 3 cannot form an 8-connectivity relationship; therefore, pixel 2 cannot be deleted. One of pixel 3 and pixel 4 can be deleted. For example, if pixel 3 is deleted, pixel 2 and pixel 4 can form an 8-connectivity relationship. In this case, pixel 5 can also be deleted, and pixel 4 and pixel 6 can form an 8-connectivity relationship. If pixel 4 is deleted, then pixel 3 and pixel 5 can form an 8-connectivity relationship. In this case, pixel 5 cannot be deleted, and pixel 6, as an endpoint, cannot be deleted. Under this rule, the redundant pixels in each boundary are deleted, so that each boundary is smoother.

S740: removing, in the third undirected graph, an edge between the first node corresponding to the background edge and the second node corresponding to the foreground edge, to obtain the first undirected graph.

Understandably, on the basis of S730, in the third undirected graph, according to the 8-connectivity rule of the boundary and the property that the depth value of the pixel point on the foreground edge is less than the depth value of the pixel point on the background edge, the pixel points on the background edge corresponding to all the pixel points on the foreground edge are determined, and the edge between the first node corresponding to the background edge and the second node corresponding to the foreground edge is disconnected to obtain the first undirected graph. Disconnecting an edge between nodes means deleting the edge connecting the nodes.

Understandably, taking 8-connectivity as an example, an intermediate point in 8-connectivity is regarded as any pixel point on the foreground edge. According to the property of 8-connectivity, the intermediate point (any pixel point) has 8 adjacent pixel points, that is, the pixel points on the upper, lower, left and right sides of the intermediate point and the pixel points on 4 corners of the intermediate point. Further, adjacent pixel points of 4-connectivity are found from the 8 adjacent pixel points, that is, 4 pixel points on the upper, lower, left and right sides of the intermediate point are found, and the pixel point on the background edge corresponding to the intermediate point is further determined from the 4 pixel points. It can be determined by the following method: the left and right pixels among the 4 pixels on the upper, lower, left and right sides of the intermediate point are taken as a group, and the upper and lower pixels are taken as another group; the depth values of the left and right pixels are compared, and the depth values of the upper and lower pixels are compared; if the depth value of the pixel on the left side of the intermediate point is greater than the depth value of the pixel on the right side of the intermediate point, the pixel on the left side can be taken as the pixel on the background edge corresponding to the intermediate point. Similarly, if the depth value of the pixel on the upper side of the intermediate point is greater than the depth value of the pixel on the lower side of the intermediate point, the pixel on the upper side can be taken as the pixel on the background edge corresponding to the intermediate point. That is to say, for the same pixel on the foreground edge, there can be more than one pixel on the background edge corresponding thereto. Further, the background edge can be obtained based on the pixel points on the background edge that are determined according to the pixel points on the foreground edge, and the background edge can be the boundary 410 or the boundary 430 as shown in FIG. 4.

Understandably, if the intermediate point in 8-connectivity is a certain pixel point on the foreground edge, the pixel on the left side of the intermediate point and the pixel on the upper side of the intermediate point are pixels on the background edge corresponding to the intermediate point. Further, in the third undirected graph that is complete and has no broken edge, the edge between the node corresponding to the intermediate point and the node corresponding to the pixel on the left side is disconnected, and the edge between the node corresponding to the intermediate point and the node corresponding to the pixel on the upper side is disconnected. Similarly, for other pixel points on the foreground edge, related operations of similar edge disconnection process are also needed.

Illustratively, referring to FIG. 3, the dashed line between the first node 310 and the second node 330 in FIG. 3 indicates the state after the edge disconnection process, and the dashed line between the first node 320 and the second node 340 also indicates the state after the edge disconnection process.

Optionally, after the edge disconnection process is performed on the nodes between the foreground edge and the background edge, a depth smoothing method can also be applied to smooth the depth values of pixel points on the background edge, the depth values of pixel points on the foreground edge, the depth values of pixel points close to the background edge in the background and the depth values of pixel points close to the foreground edge in the foreground.

Understandably, smoothing the depth values of pixel points makes the depth values of pixel points close to the background edge in the background smoother, and also makes the depth values of pixel points close to the foreground edge in the foreground smoother, so that the depth values of pixel points on the foreground edge are quite different from the depth values of pixel points on the background edge, that is, the depth values between the foreground edge and the background edge are quite different, which is more convenient to distinguish the foreground edge from the background edge.

In the image processing method provided by the embodiment of the present disclosure, by performing a smoothing, filling and edge disconnection process on the first undirected graph, the foreground edge can be accurately distinguished from the background edge, thus effectively avoiding the problem that edge distortion easily occurs to the foreground edge.

FIG. 9 is a flowchart of another image processing method according to an embodiment of the present disclosure. Optionally, adding the one or more third nodes to the first undirected graph according to the first node corresponding to the background edge and the second node corresponding to the foreground edge, to obtain the second undirected graph, specifically includes the following steps S910 to S930 as shown in FIG. 8:

S910: taking the first node corresponding to the background edge as a reference node, and generating, in the case that no node at a preset neighborhood position relative to the reference node is connected to the reference node, a third node at the preset neighborhood position, the preset neighborhood position including a position of the second node corresponding to the foreground edge in the first undirected graph.

Understandably, after the first undirected graph is obtained, the background edge is filled, that is, new nodes are added to the first undirected graph. For each first node corresponding to the background edge, according to the rule of 4-connectivity, if there is no node connected to the reference node at the preset neighborhood position of the reference node, for example, in FIG. 5, there is no node connected to the first node 510, which serves as a reference node, on the right side of the first node 510, a third node is generated at the preset neighborhood position. The preset neighborhood position includes the position of a second node corresponding to the foreground edge in the first undirected graph, and this second node is adjacent to but not connected to the first node which serves as a reference node. For example, the preset neighborhood position is the position of the second node 530 in the first undirected graph under the rule of 4-connectivity, and the generated third node is the node 550 in FIG. 5.

Illustratively, referring to FIG. 5, for the first node 510 or 520 in FIG. 5, under the condition of 4-connectivity, it is judged that in which direction of the upward, downward, left and right directions, the first node 510 has no neighboring node. In FIG. 5, the first node 510 has no neighboring node in the right direction, because the edge between the first node 510 and the second node 530 is broken. Therefore, a new node is generated according to the first node 510, that is, a new node (third node) 550 is added to the first undirected graph. This new node 550 is taken as a node adjacent to and connected to the first node 510 in the right direction, and there is an edge connection between this new node 550 and the first node 510. The position information stored by the new node 550 is the position information of the pixel point corresponding to the second node 530 previously connected to the first node 510, the color information stored by the new node 550 is generated according to the color information stored by the first node 510, and the depth value stored by the new node 550 is the depth value stored by the first node 510. Further, a node 560 adjacent to and connected to the new node 550 can also be generated, the node 560 is only an adjacent node of the new node 550 in a certain direction, and the adjacent nodes of the new node 550 in other directions can also be generated. An adjacent node of the node 560 can continue to be generated, and so on in an analogous manner to keep spreading and adding new nodes. The growth process of the neighboring nodes missing from other first nodes is similar to this process, which will not be repeated here. An undirected graph structure with overlapping nodes in the image space can be obtained through continuous spreading and growth.

Optionally, taking the first node corresponding to the background edge as the reference node specifically includes: dividing first nodes corresponding to all pixel points on the background edge into one or more groups; and taking each first node within each group as the reference node.

Understandably, all the first nodes included in the background edge are divided into one or more groups, and after grouping, each first node is taken as a reference node to generate a third node.

Optionally, dividing the first nodes corresponding to all pixel points on the background edge into the one or more groups specifically includes: determining an endpoint of the background edge; traversing, starting from a first node corresponding to the endpoint, the first nodes corresponding to all pixel points on the background edge; in the case that a currently traversed first node has no branches, labeling the currently traversed first node with a same label as a previously traversed first node; in the case that the currently traversed first node has a plurality of branches, determining a target branch from the plurality of branches, and taking the target branch as a subsequently traversed first node, where a difference between a depth value stored by a first node on the target branch and a depth value stored by the previously traversed first node is less than or equal to a preset difference; and dividing, by the traversing, the first nodes corresponding to all pixel points on the background edges into the one or more groups, first nodes within a same group having a same label.

Understandably, on each boundary in the background edge, except the first nodes corresponding to the pixel points serving as the endpoints, other first nodes are all connected. Each boundary includes a plurality of first nodes, the traversal is started from the first node corresponding to an endpoint. If the currently traversed first node has no branches, no branches meaning that only one backbone is included, for example, the boundaries 410 and 430 in the background edge shown in FIG. 4 do not include branches, then the currently traversed first node is labelled with the same label as the label of the previously traversed first node. And then the first nodes with the same label are divided into a group, and for example, all the first nodes on the boundary 430 in the background edge in FIG. 4 have the same label, and the label can be boundary 1. In the process of traversal, if the currently traversed first node has a plurality of branches, a target branch is determined from the plurality of branches, and the target branch is taken as a subsequently traversed branch. For example, in the case of including two branches, the two branches are similar to the herringbone shape. There are two branches after the currently traversed first node, and it is determined that on which branch the depth value of the first node is closer to the depth value of the previously traversed first node of the currently traversed first node, and the branch on which the first node has the closer depth value is taken as the target branch. And then, the first nodes on the target branch are traversed, and all the traversed first nodes are labelled with the same label; and the traversal is stopped for other branches that are not the target branches. Understandably, the nodes on a plurality of boundaries can be traversed at one time, each boundary will be traversed, and each branch will be traversed. The difference between the depth value stored by the first node on the target branch and the depth value stored by the previously traversed first node is less than or equal to a preset difference, that is, the depth value stored by the first node on the target branch is relatively close to the depth value stored by the previously traversed first node, and the preset difference can be set according to the user's needs. After the traversal, the first nodes corresponding to all pixel points on the background edge can be divided into one or more groups, and the first nodes within the same group have the same label, that is, the first nodes with the same label are divided into one group.

Illustratively, referring to FIG. 4, the first nodes corresponding to all pixel points on the boundary 410 are divided into one group, and the first nodes corresponding to all pixel points on the boundary 430 are divided into one group.

S920: adding the third node to the first undirected graph, and establishing an edge connected between the reference node and the third node.

Understandably, on the basis of S810, the added third nodes corresponding to all the first nodes are added to the first undirected graph, and an edge connected between the first node serving as a reference node and the newly added third node is established. For example, in FIG. 5, there is an edge connected between the third node 550 and the first node 510.

S930: taking the third node as a reference node, and continuing to generate the third node at a preset neighborhood position relative to the reference node, until the third node fails to satisfy a preset growth condition, to obtain the second undirected graph.

Understandably, on the basis of S920, the newly added third node corresponding to the first node is taken as a reference node, and a new third node is continuously generated at the preset neighborhood position relative to the reference node. The process of generating the new third node is similar to the above-mentioned process of generating the newly added third node, which is not repeated here. Until the third node fails to satisfy a preset growth condition, the second undirected graph is obtained.

Optionally, the preset growth condition can be that boundaries in the same group cannot overlap with each other, and there cannot be nodes at positions with similar depths.

Understandably, boundaries in the same group cannot overlap with each other, which means: the same group is assumed to include but not limited to node A and node B, node A corresponds to a point A1 to be grown; the point to be grown means that if the preset neighborhood position of node A in the group has no edge, the preset neighborhood position is recorded as the position of the point A1 to be grown; node B corresponds to a point B1 to be grown, and the position information corresponding to A1 and the position information corresponding to B1 are the same; in this case, it is not necessary to grow two new nodes for the same position information, instead, only one new node is needed to be grown; the position information stored by the new node is the same position information, the depth value stored by the new node can be the average of the depth value stored by node A and the depth value stored by node B, and the color information (RGB values) stored by the new node can be the average of the color information stored by node A and the color information stored by node B. There cannot be nodes at positions with similar depths, which means: as shown in FIG. 5, because the depth value stored by the first node 510 is greater than the depth value stored by the second node 530 and the depth value stored by the third node 550 is the same as the depth value stored by the first node 510, the depth value stored by the third node 550 is greater than the depth value stored by the second node 530; in this case, the third node 550 can be successfully grown. However, in the case where the neighboring node 560 is generated according to the third node 550, because the position information stored by the node 560 is the same as the position information stored by the second node 540, it is necessary to judge whether the depth value stored by the node 560 is close to the depth value stored by the second node 560; if so, the node 560 will not be grown, and the growth of the neighboring node of the node 560 will also be stopped.

In the image processing method provided by the embodiment of the present disclosure, by filling the edge holes in the first undirected graph, the phenomenon of holes in the foreground edge can be effectively avoided, the accuracy of each obtained background edge or foreground edge can be ensured, and the loss of image features can be avoided.

FIG. 10 is a flowchart of another image processing method according to an embodiment of the present disclosure. Optionally, performing block processing on the second undirected graph to obtain the plurality of first blocks, specifically includes the following steps S1100 to S1300:

S1100: performing complete cutting on a pixel filling image corresponding to the second undirected graph according to the background edge, to obtain a plurality of second blocks.

Understandably, new nodes are added to the first undirected graph to obtain the second undirected graph. Adding nodes to the undirected graph is equivalent to adding pixel points in the image. The pixel filling image corresponding to the second undirected graph is obtained by adding pixels to the image corresponding to the first undirected graph. Complete cutting is performed on the pixel filling image corresponding to the second undirected graph. Starting from the endpoint of the boundary that serves as the background edge, each boundary can be extended, so that the endpoint of each extended boundary reaches the image boundary, and this image is the image corresponding to the second undirected graph. Therefore, each extended boundary can completely cut the image to obtain a plurality of cutting blocks (second blocks). It can be understood that the filled first undirected graph (the second undirected graph) is obtained by adding some new nodes to the first undirected graph. Because one node corresponds to one pixel, the image corresponding to the second undirected graph is obtained by adding some pixels to the image corresponding to the first undirected graph, and these added pixels may overlap in position with some original pixels in the image corresponding to the first undirected graph.

S1200: performing, for each second block among the plurality of second blocks, a current traversal on nodes within a preset range by taking any node corresponding to the second block in the second undirected graph as a starting point.

Understandably, on the basis of S1100, for each second block among the plurality of second blocks, by taking any node among the plurality of nodes corresponding to the second block, a breadth-first search traversal is performed on the nodes adjacent thereto and having edges. The preset range of nodes traversed each time can be a node range corresponding to a 50*50 sized image block, that is, an irregular second block is divided into one or more 50*50 sized image blocks. There may be pixels that do not exist in the image blocks, and the pixel values of the non-existing pixels can be set to 0.

S1300: continuing to perform, after the current traversal is completed, a next traversal by taking any node outside the preset range as a starting point, until all nodes corresponding to the second block in the second undirected graph are traversed.

Understandably, on the basis of S1200, after one traversal is completed, other nodes at the outer side of the preset range are selected as starting points, and the above process is cycled for traversal until all nodes corresponding to the second block in the second undirected graph are traversed. The node serving as the starting point during the next traversal can also be selected randomly or sequentially from the remaining nodes that have not been traversed. After the first undirected graph is filled, the case in which the same position information corresponds to a plurality of nodes may occur, so this step can ensure that different nodes in the same second block have no overlapping nodes in position information. Further, according to the color information stored by each node in the second block, the texture information corresponding to the second block is generated.

Optionally, the nodes traversed in each traversal process correspond to one first block.

Understandably, in the process of traversing each node in the second block, the nodes traversed in each traversal process are divided into one first block, the first block is generated by traversing the second block, and one image block exists for each first block.

Optionally, the nodes traversed during each traversal satisfy at least one of the following conditions: the nodes traversed during each traversal do not exceed the preset range; pixel points corresponding to the nodes traversed during each traversal do not cross the background edge; and the pixel points corresponding to the nodes traversed during each traversal process do not cross an extension line of the background edge.

Understandably, during each traversal, it is necessary to ensure that the traversed nodes do not exceed the preset range, that the pixel points corresponding to the traversed nodes do not cross the background edge, and that the pixel points corresponding to the traversed nodes do not cross the extension line of the background edge, to ensure that no nodes with the same position information appear in the second block obtained by each traversal, that is, to ensure that there are no overlapping points in the image space in the image block corresponding to the second block obtained by each traversal.

In the image processing method provided by the embodiment of the disclosure, complete cutting is performed on a pixel filling image corresponding to the second undirected graph according to the background edge, to obtain a plurality of second blocks; then, for each second block among the plurality of second blocks, a current traversal is performed on nodes within a preset range by taking any node corresponding to the second block in the second undirected graph as a starting point; and finally, after the current traversal is completed, a next traversal continues to be performed by taking any node outside the preset range as a starting point, until all nodes corresponding to the second block in the second undirected graph are traversed. By performing block processing on the second undirected graph, the information integrity of the two-dimensional mesh can be ensured, the features of the target image can be obtained to the maximum extent, thus facilitating obtaining the texture image and the information of the two-dimensional mesh subsequently.

FIG. 11 is a flowchart of another image processing method according to an embodiment of the present disclosure. In the present embodiment, on the basis of the foregoing embodiments, the image processing method is further described in detail. Optionally, obtaining the texture image and the textureless three-dimensional mesh according to information stored in the plurality of first blocks, specifically includes the following steps S1110 to S1130 as shown in the figure:

S1110: obtaining the texture image according to textures respectively corresponding to the plurality of first blocks.

Optionally, obtaining the texture image according to the textures respectively corresponding to the plurality of first blocks specifically includes: stitching the textures respectively corresponding to the plurality of first blocks to obtain the texture image; a texture corresponding to a first block is obtained according to three primary color information stored in the first block.

Understandably, a texture image is obtained by stitching and combining according to the texture corresponding to each first block; for example, the texture image can be shown as 630 in FIG. 6. The texture corresponding to the first block can be obtained according to the three primary color information stored by each node in the first block, and the three primary color information refers to the information of three primary colors of RGB, that is, the color information stored by the node.

S1120: performing two-dimensional triangulation according to the information stored in the plurality of first blocks to obtain information of a two-dimensional mesh.

Optionally, performing two-dimensional triangulation according to the information stored in the plurality of first blocks to obtain the information of the two-dimensional mesh specifically includes: determining, for each first block among the plurality of first blocks, an image block corresponding to the first block; selecting a target vertex from outer boundary vertices of an outermost layer of pixel points of the image block, so that common boundary vertices of adjacent image blocks are the same; performing two-dimensional triangulation on the image block according to the target vertex to obtain the information of the two-dimensional mesh.

Understandably, on the basis of S1110, for each first block, an image block corresponding to each first block is determined; a target vertex is selected from the outer boundary vertices of the outermost layer of pixel points of the image block, and the target vertex refers to the real boundary vertex of the image block, so that the common boundary vertices of adjacent image blocks are the same, thus ensuring that there is no crack at the boundary of the image block after meshing. Then, two-dimensional triangulation is performed on the image block according to the target vertex, and a plurality of target vertices can be determined, and the interval between adjacent vertices among the target vertices can be the same. Finally, by uniformly selecting points, the image block is divided into a plurality of triangular sub-image blocks by using a constrained triangulation algorithm, and the information of the two-dimensional mesh is obtained according to a plurality of sub-image blocks obtained by triangulation, the two-dimensional mesh is formed of a plurality of triangular image blocks, and at this time, no depth value is assigned to the vertices of the image blocks.

Illustratively, referring to FIG. 12, which is a schematic structural diagram of an image block provided by an embodiment of the present disclosure, the image block 1200 is formed of 3*3 pixels, each color represents one pixel point, and one pixel can also be understood as a small region. The outer boundary vertices of the outermost layer of pixel points can be a plurality of black dots at the outermost layer of the image block 1200. The target vertices can be vertices 1210, 1220, 1230 and 1240 at four corners in the image block 1200. The image block 1200 can be divided into two triangular image blocks through a connection line between the vertex 1220 and the vertex 1230.

S1130: assigning a depth value to a vertex of the two-dimensional mesh according to the information of the two-dimensional mesh to obtain the textureless three-dimensional mesh.

Understandably, on the basis of S1120, according to the information of the two-dimensional mesh, the textureless three-dimensional mesh is obtained after assigning the depth value to the vertex of the two-dimensional mesh. For example, the three-dimensional mesh 620 without texture in FIG. 6 is all formed of triangular image blocks.

In the image processing method provided by the embodiment of the disclosure, the texture image is obtained according to the textures respectively corresponding to the plurality of first blocks; then, two-dimensional triangulation is performed according to the information stored in the plurality of first blocks to obtain information of the two-dimensional mesh; and finally, a textureless three-dimensional mesh is obtained by assigning the depth value to the vertex of the two-dimensional mesh according to the information of the two-dimensional mesh, so that the obtained textureless three-dimensional mesh can be ensured to have no crack, and the determined texture image is relatively accurate. The three-dimensional image of the target image can be obtained directly through the simple stitching of the texture image and the textureless three-dimensional mesh, the problem of edge distortion is effectively reduced, and the time consumption is relatively short.

Figure 13:
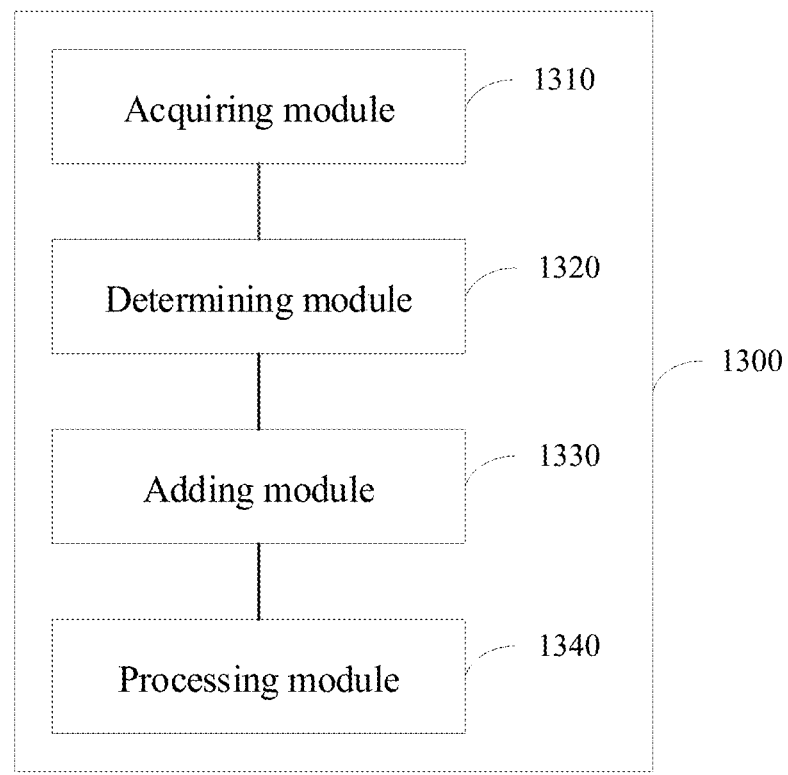
FIG. 13 is a schematic structural diagram of an image processing apparatus according to an embodiment of the present disclosure.

FIG. 13 is a schematic structural diagram of an image processing apparatus according to an embodiment of the present disclosure. The image processing apparatus provided by the embodiment of the present disclosure can be configured in a client or a server, and the image processing apparatus 1300 specifically includes:

an acquiring module 1310, configured to acquire a depth image corresponding to a target image;

a determining module 1320, configured to determine a first undirected graph according to the target image and the depth image, where the first undirected graph includes a first node corresponding to a background edge and a second node corresponding to a foreground edge, and there is no edge connection between the first node and the second node;

an adding module 1330, configured to add one or more third nodes to the first undirected graph according to the first node corresponding to the background edge and the second node corresponding to the foreground edge, to obtain a second undirected graph;

a processing module 1340, configured to perform block processing on the second undirected graph to obtain a plurality of first blocks, and obtain a texture image and a textureless three-dimensional mesh according to information stored in the plurality of first blocks, wherein the texture image and the textureless three-dimensional mesh form a target three-dimensional mesh.

Optionally, the determining module 1320, when determining the first undirected graph according to the target image and the depth image, is specifically configured to: generate, according to the target image and the depth image, a third undirected graph that is complete and has no broken edge; generate a boundary mask image according to the target image and the depth image; process the boundary mask image to obtain a processed boundary mask image, the processed boundary mask image including the foreground edge and the background edge; remove, in the third undirected graph, an edge between the first node corresponding to the background edge and the second node corresponding to the foreground edge, to obtain the first undirected graph.

Optionally, the determining module 1320, when generating the boundary mask image according to the target image and the depth image, is specifically configured to: sharpen the depth image to obtain a sharpened depth image; generate the boundary mask image according to the target image and the sharpened depth image.

Optionally, the determining module 1320, when processing the boundary mask image to obtain the processed boundary mask image, is specifically configured to: process one or more boundaries in the boundary mask image to obtain a foreground edge in the boundary mask image; generate a background edge in the boundary mask image according to the foreground edge in the boundary mask image, to obtain the processed boundary mask image.

Optionally, the determining module 1320, when processing the one or more boundaries in the boundary mask image to obtain the foreground edge in the boundary mask image, is specifically configured to: remove, for each boundary in the boundary mask image, redundant pixel points on the boundary; connect boundaries with a distance less than a preset distance in the boundary mask image; remove boundaries having a length less than a preset length in the boundary mask image, and take remaining boundaries in the boundary mask image as the foreground edge in the boundary mask image.

Optionally, the adding module 1330, when adding the one or more third nodes to the first undirected graph according to the first node corresponding to the background edge and the second node corresponding to the foreground edge, to obtain the second undirected graph, is specifically configured to: take the first node corresponding to the background edge as a reference node, and generate, in the case that no node at a preset neighborhood position relative to the reference node is connected to the reference node, a third node at the preset neighborhood position, wherein the preset neighborhood position includes a position of the second node corresponding to the foreground edge in the first undirected graph; add the third node to the first undirected graph, and establish an edge connected between the reference node and the third node; take the third node as the reference node, and continue to generate the third node at a preset neighborhood position relative to thereference node, until the third node fails to satisfy a preset growth condition, to obtain the second undirected graph.

Optionally, the adding module 1330, when taking the first node corresponding to the background edge as the reference node, is specifically configured to: divide first nodes corresponding to all pixel points on the background edge into one or more groups; take each first node within each group as the reference node.

Optionally, the adding module 1330, when dividing the first nodes corresponding to all pixel points on the background edge into the one or more groups, is specifically configured to: determine an endpoint of the background edge; traverse, starting from a first node corresponding to the endpoint, the first nodes corresponding to all pixel points on the background edge; in the case that a currently traversed first node has no branches, label the currently traversed first node with a same label as a previously traversed first node; in the case that the currently traversed first node has a plurality of branches, determine a target branch from the plurality of branches, and take the target branch as a subsequently traversed first node, a difference between a depth value stored by a first node on the target branch and a depth value stored by the previously traversed first node being less than or equal to a preset difference; divide, by the traversing, the first nodes corresponding to all pixel points on the background edges into the one or more groups, wherein first nodes within a same group have a same label.

Optionally, the adding module 1330, when performing block processing on the second undirected graph to obtain the plurality of first blocks, is specifically configured to: perform complete cutting on a pixel filling image corresponding to the second undirected graph according to the background edge, to obtain a plurality of second blocks; perform, for each second block among the plurality of second blocks, a current traversal on nodes within a preset range by taking any node corresponding to the second block in the second undirected graph as a starting point; continue to perform, after the current traversal is completed, a next traversal by taking any node outside the preset range as a starting point, until all nodes corresponding to the second block in the second undirected graph are traversed, nodes traversed during each traversal corresponding to one first block.

Optionally, in the adding module 1330, the nodes traversed during each traversal satisfy at least one of the following conditions: the nodes traversed during each traversal do not exceed the preset range; pixel points corresponding to the nodes traversed during each traversal do not cross the background edge; the pixel points corresponding to the nodes traversed during each traversal process do not cross an extension line of the Optionally, the processing module 1340, when obtaining the texture image and the textureless three-dimensional mesh according to information stored in the plurality of first blocks, is specifically configured to: obtain the texture image according to textures respectively corresponding to the plurality of first blocks; perform two-dimensional triangulation according to the information stored in the plurality of first blocks to obtain information of a two-dimensional mesh; assign a depth value to a vertex of the two-dimensional mesh according to the information of the two-dimensional mesh to obtain the textureless three-dimensional mesh.

Optionally, the processing module 1340, when performing two-dimensional triangulation according to the information stored in the plurality of first blocks to obtain the information of the two-dimensional mesh, is specifically configured to: determine, for each first block among the plurality of first blocks, an image block corresponding to the first block; select a target vertex from outer boundary vertices of a outermost layer of pixel points of the image block, so that common boundary vertices of adjacent image blocks are the same; perform two-dimensional triangulation on the image block according to the target vertex to obtain the information of the two-dimensional mesh.

Optionally, the processing module 1340, when obtaining the texture image according to the textures respectively corresponding to the plurality of first blocks, is specifically configured to: stitch the textures respectively corresponding to the plurality of first blocks to obtain the texture image, a texture corresponding to a first block being obtained according to three primary color information stored in the first block.

The image processing apparatus provided by the embodiment of the present disclosure can execute the steps executed by the terminal or the server in the image processing method provided by the embodiment of the present disclosure, and the execution steps and beneficial effects are the same, which will not be repeated here.

Figure 14:
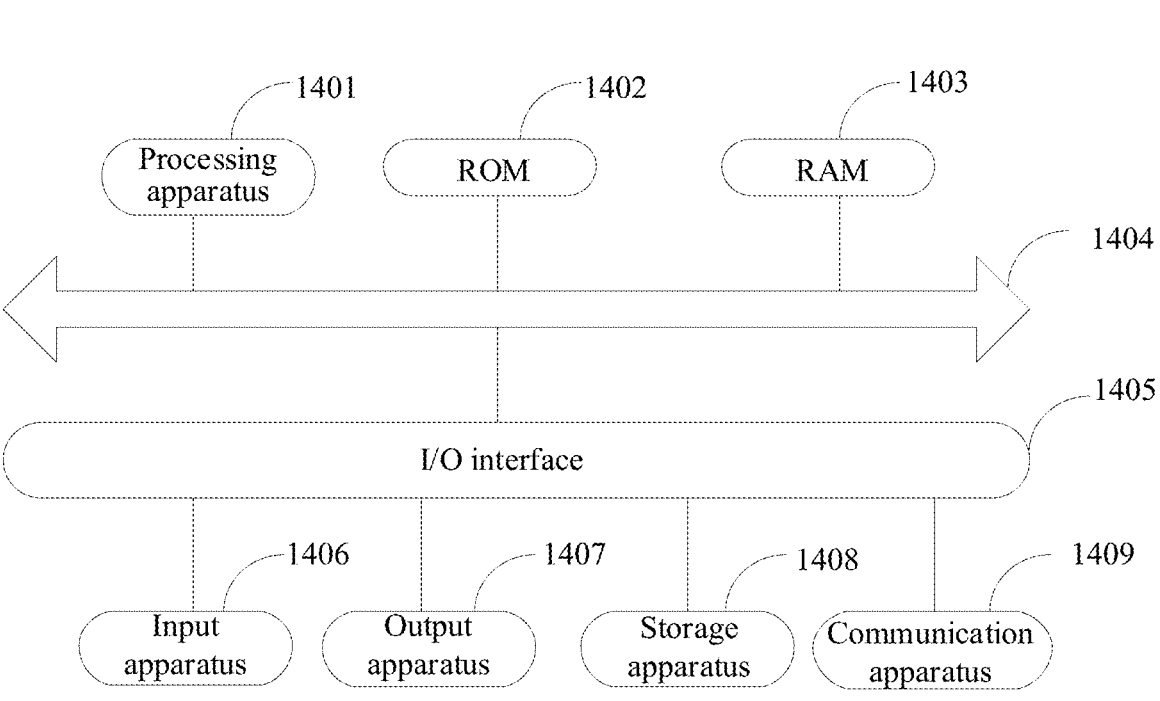
FIG. 14 is a schematic structural diagram of an electronic device according to an embodiment of the present disclosure.

FIG. 14 is a schematic structural diagram of an electronic device according to an embodiment of the present disclosure. FIG. 14 is specifically referred below, and it shows the structure schematic diagram suitable for achieving the electronic device 1400 in the embodiment of the present disclosure. The electronic device 1400 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 14 is only an example and should not impose any limitations on the functions and use scopes of the embodiments of the present disclosure.

As shown in FIG. 14, the electronic device 1400 may include a processing apparatus (such as a central processing unit, and a graphics processor) 1401, it may execute various appropriate actions and processes to implement the image processing method in embodiments of the present disclosure according to a program stored in a read-only memory (ROM) 1402 or a program loaded from a storage apparatus 1408 to a random access memory (RAM) 1403. In RAM 1403, various programs and data required for operations of the electronic device 1400 are also stored. The processing apparatus 1401, ROM 1402, and RAM 1403 are connected to each other by a bus 1404. An input/output (I/O) interface 1405 is also connected to the bus 1404.

Typically, the following apparatuses may be connected to the I/O interface 1405: an input apparatus 1406 such as a touch screen, a touchpad, a keyboard, a mouse, a camera, a microphone, an accelerometer, and a gyroscope; an output apparatus 1407 such as a liquid crystal display (LCD), a loudspeaker, and a vibrator; a storage apparatus 1408 such as a magnetic tape, and a hard disk drive; and a communication apparatus 1409. The communication apparatus 1409 may allow the electronic device 1400 to wireless-communicate or wire-communicate with other devices to exchange data. Although FIG. 14 shows the electronic device 1400 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 1409, or installed from the storage apparatus 1408, or installed from ROM 1402. When the computer program is executed by the processing apparatus 1401, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The computer-readable medium may be contained in the electronic device; or it may exist separately and not be assembled into such electronic device.

The computer-readable medium carries one or more programs, and when the one or more programs are executed by the electronic device, the electronic device is caused to: acquire a depth image corresponding to a target image; determine a first undirected graph according to the target image and the depth image, where the first undirected graph includes a first node corresponding to a background edge and a second node corresponding to a foreground edge, and there is no edge connection between the first node and the second node; add one or more third nodes to the first undirected graph according to the first node corresponding to the background edge and the second node corresponding to the foreground edge, to obtain a second undirected graph; perform block processing on the second undirected graph to obtain a plurality of first blocks; and obtain a texture image and a textureless three-dimensional mesh according to information stored in the plurality of first blocks, the texture image and the textureless three-dimensional mesh forming a target three-dimensional mesh.

Optionally, when one or more of the above programs are executed by the electronic device, the electronic device may also perform other steps of the above embodiments.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. An image processing method, comprising:

acquiring a depth image corresponding to a target image;

determining a first undirected graph according to the target image and the depth image, wherein the first undirected graph comprises a first node corresponding to a background edge and a second node corresponding to a foreground edge, and there is no edge connection between the first node and the second node;

adding one or more third nodes to the first undirected graph according to the first node corresponding to the background edge and the second node corresponding to the foreground edge, to obtain a second undirected graph;

performing block processing on the second undirected graph to obtain a plurality of first blocks; and obtaining a texture image and a textureless three-dimensional mesh according to information stored in the plurality of first blocks, wherein the texture image and the textureless three-dimensional mesh form a target three-dimensional mesh.

2. The method according to claim 1, wherein determining the first undirected graph according to the target image and the depth image comprises:

generating, according to the target image and the depth image, a third undirected graph that is complete and has no broken edge;

generating a boundary mask image according to the target image and the depth image;

processing the boundary mask image to obtain a processed boundary mask image, wherein the processed boundary mask image comprises the foreground edge and the background edge; and removing, in the third undirected graph, an edge between the first node corresponding to the background edge and the second node corresponding to the foreground edge, to obtain the first undirected graph.

3. The method according to claim 2, wherein generating the boundary mask image according to the target image and the depth image comprises:

sharpening the depth image to obtain a sharpened depth image; and generating the boundary mask image according to the target image and the sharpened depth image.

4. The method according to claim 2, wherein processing the boundary mask image to obtain the processed boundary mask image comprises:

processing one or more boundaries in the boundary mask image to obtain a foreground edge in the boundary mask image; and generating a background edge in the boundary mask image according to the foreground edge in the boundary mask image, to obtain the processed boundary mask image.

5. The method according to claim 4, wherein processing the one or more boundaries in the boundary mask image to obtain the foreground edge in the boundary mask image comprises:

removing, for each boundary in the boundary mask image, redundant pixel points on the boundary;

connecting boundaries with a distance less than a preset distance in the boundary mask image; and removing boundaries having a length less than a preset length in the boundary mask image, and taking remaining boundaries in the boundary mask image as the foreground edge in the boundary mask image.

6. The method according to claim 1, wherein adding the one or more third nodes to the first undirected graph according to the first node corresponding to the background edge and the second node corresponding to the foreground edge, to obtain the second undirected graph, comprises:

taking the first node corresponding to the background edge as a reference node, and generating, in a case that no node at a preset neighborhood position relative to the reference node is connected to the reference node, a third node at the preset neighborhood position, wherein the preset neighborhood position comprises a position of the second node corresponding to the foreground edge in the first undirected graph;

adding the third node to the first undirected graph, and establishing an edge connected between the reference node and the third node; and taking the third node as a reference node, and continuing to generate the third node at a preset neighborhood position relative to the reference node, until the third node fails to satisfy a preset growth condition, to obtain the second undirected graph.

7. The method according to claim 6, wherein taking the first node corresponding to the background edge as the reference node comprises:

dividing first nodes corresponding to all pixel points on the background edge into one or more groups; and taking each first node within each group as the reference node.

8. The method according to claim 7, wherein dividing the first nodes corresponding to all pixel points on the background edge into the one or more groups comprises:

determining an endpoint of the background edge;

traversing, starting from a first node corresponding to the endpoint, the first nodes corresponding to all pixel points on the background edge;

in a case that a currently traversed first node has no branches, labeling the currently traversed first node with a same label as a previously traversed first node;

in a case that the currently traversed first node has a plurality of branches, determining a target branch from the plurality of branches, and taking the target branch as a subsequently traversed first node, wherein a difference between a depth value stored by a first node on the target branch and a depth value stored by the previously traversed first node is less than or equal to a preset difference; and dividing, by the traversing, the first nodes corresponding to all pixel points on the background edge into the one or more groups, wherein first nodes within a same group have a same label.

9. The method according to claim 1, wherein performing block processing on the second undirected graph to obtain the plurality of first blocks comprises:

performing complete cutting on a pixel filling image corresponding to the second undirected graph according to the background edge, to obtain a plurality of second blocks;

performing, for each second block among the plurality of second blocks, a current traversal on nodes within a preset range by taking any node corresponding to the second block in the second undirected graph as a starting point; and continuing to perform, after the current traversal is completed, a next traversal by taking any node outside the preset range as a starting point, until all nodes corresponding to the second block in the second undirected graph are traversed, wherein nodes traversed during each traversal correspond to one first block among the plurality of first blocks.

10. The method according to claim 9, wherein the nodes traversed during each traversal do not exceed the preset range, pixel points corresponding to the nodes traversed during each traversal do not cross the background edge, and/or the pixel points corresponding to the nodes traversed during each traversal process do not cross an extension line of the background edge.

11. The method according to claim 1, wherein obtaining the texture image and the textureless three-dimensional mesh according to information stored in the plurality of first blocks comprises:

obtaining the texture image according to textures respectively corresponding to the plurality of first blocks;

performing two-dimensional triangulation according to the information stored in the plurality of first blocks to obtain information of a two-dimensional mesh; and assigning a depth value to a vertex of the two-dimensional mesh according to the information of the two-dimensional mesh to obtain the textureless three-dimensional mesh.

12. The method according to claim 11, wherein performing two-dimensional triangulation according to the information stored in the plurality of first blocks to obtain the information of the two-dimensional mesh comprises:

determining, for each first block among the plurality of first blocks, an image block corresponding to the first block;

selecting a target vertex from outer boundary vertices of an outermost layer of pixel points of the image block, so that common boundary vertices of adjacent image blocks are identical; and performing two-dimensional triangulation on the image block according to the target vertex to obtain the information of the two-dimensional mesh.

13. The method according to claim 11, wherein obtaining the texture image according to the textures respectively corresponding to the plurality of first blocks comprises:

stitching the textures respectively corresponding to the plurality of first blocks to obtain the texture image, wherein a texture corresponding to a first block among the plurality of first blocks is obtained according to three primary color information stored in the first block.

14. A non-transitory computer-readable storage medium, storing computer programs, wherein the computer programs upon being executed by a processor, implements the method according to claim 1.

15. An image processing apparatus, comprising:

an acquiring module, configured to acquire a depth image corresponding to a target image;

a determining module, configured to determine a first undirected graph according to the target image and the depth image, wherein the first undirected graph comprises a first node corresponding to a background edge and a second node corresponding to a foreground edge, and there is no edge connection between the first node and the second node;

an adding module, configured to add one or more third nodes to the first undirected graph according to the first node corresponding to the background edge and the second node corresponding to the foreground edge, to obtain a second undirected graph; and a processing module, configured to perform block processing on the second undirected graph to obtain a plurality of first blocks, and obtain a texture image and a textureless three-dimensional mesh according to information stored in the plurality of first blocks, wherein the texture image and the textureless three-dimensional mesh form a target three-dimensional mesh.

16. An electronic device, comprising:

one or more processors; and a storage apparatus, configured to store one or more programs;

wherein the one or more programs, upon being executed by the one or more processors, cause the one or more processors to implement operations comprising:

acquiring a depth image corresponding to a target image;

determining a first undirected graph according to the target image and the depth image, wherein the first undirected graph comprises a first node corresponding to a background edge and a second node corresponding to a foreground edge, and there is no edge connection between the first node and the second node;

adding one or more third nodes to the first undirected graph according to the first node corresponding to the background edge and the second node corresponding to the foreground edge, to obtain a second undirected graph;

performing block processing on the second undirected graph to obtain a plurality of first blocks; and obtaining a texture image and a textureless three-dimensional mesh according to information stored in the plurality of first blocks, wherein the texture image and the textureless three-dimensional mesh form a target three-dimensional mesh.

17. The electronic device according to claim 16, wherein determining the first undirected graph according to the target image and the depth image comprises:

generating, according to the target image and the depth image, a third undirected graph that is complete and has no broken edge;

generating a boundary mask image according to the target image and the depth image;

processing the boundary mask image to obtain a processed boundary mask image, wherein the processed boundary mask image comprises the foreground edge and the background edge; and removing, in the third undirected graph, an edge between the first node corresponding to the background edge and the second node corresponding to the foreground edge, to obtain the first undirected graph.

18. The electronic device according to claim 17, wherein generating the boundary mask image according to the target image and the depth image comprises:

sharpening the depth image to obtain a sharpened depth image; and generating the boundary mask image according to the target image and the sharpened depth image.

19. The electronic device according to claim 17, wherein processing the boundary mask image to obtain the processed boundary mask image comprises:

processing one or more boundaries in the boundary mask image to obtain a foreground edge in the boundary mask image; and generating a background edge in the boundary mask image according to the foreground edge in the boundary mask image, to obtain the processed boundary mask image.

20. The electronic device according to claim 19, wherein processing the one or more boundaries in the boundary mask image to obtain the foreground edge in the boundary mask image comprises:

removing, for each boundary in the boundary mask image, redundant pixel points on the boundary;

connecting boundaries with a distance less than a preset distance in the boundary mask image; and removing boundaries having a length less than a preset length in the boundary mask image, and taking remaining boundaries in the boundary mask image as the foreground edge in the boundary mask image.

* * * * *